Figure 1:
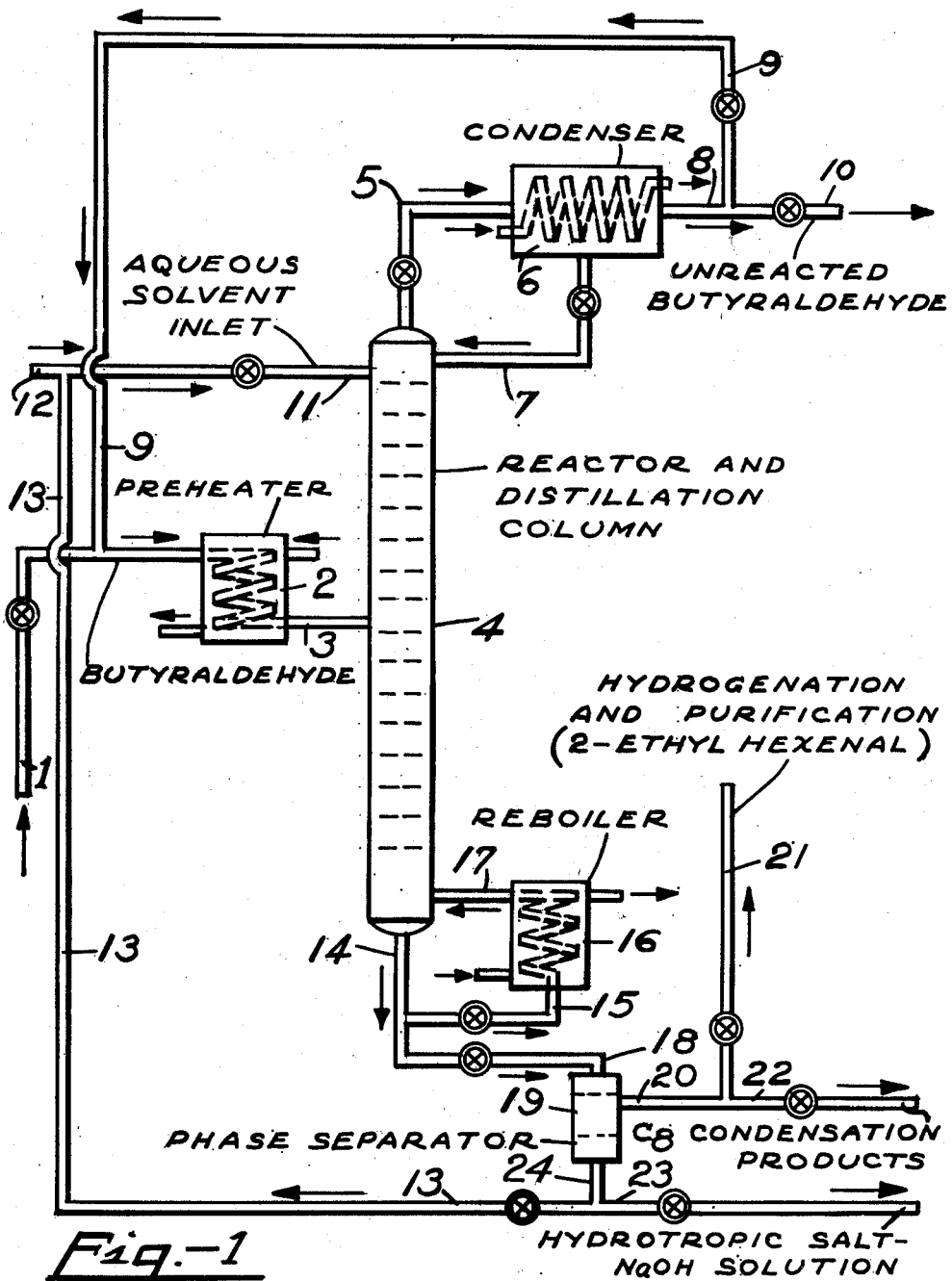

Patented July 20, 1954

2,684,385

UNITED STATES PATENT OFFICE 2,684,385

CONTINUOUS ALDOLIZATION

Frank A. Biribauer, Cranford, Carl S. Carlson, Roselle, and Charles E. Morrell, Westfield, N. J., assignors to Standard Oil Development Company, a corporation of Delaware Application December 16, 1949, Serial No. 133,442

5 Claims. (Cl. 260—601)

This invention relates to a novel continuous method for efficiently carrying out condensations of the aldolizing type with carbonyl compounds including both aldehydes and ketones and particularly aldehydes of the $C_2$ to $C_{12}$ aliphatic series.

There is described herein the aldolization of lower molecular weight aldehydes such as butyraldehyde using aqueous solutions of hydrotropic agents, particularly salts, as solvents and dilute caustic as catalyst for the aldolization to give higher molecular weight compounds than the starting materials. The products which may be conveniently obtained by this aldolization procedure include both unsaturated aldehydes and aldols. It is preferred, in order to utilize the most advantageous features of the invention, to operate in a solubilized reaction mixture in which the concentration of the solubilizer is adjusted such that the lower molecular weight carbonyl reactants are soluble in the reaction mixture but the higher molecular weight products are insoluble. It is also preferred to operate in a system in which the aldolization is carried out under extractive distillation conditions.

A specific embodiment of this invention proposes carrying out the aldolization in an apparatus such as a distillation column wherein the aldehyde is fed into an intermediate point of the column and an aqueous hydrotropic salt solution containing catalyst is charged at the top of the column. The desired aldolization product is withdrawn with the bottoms stream from the still pot.

The higher molecular weight condensation products made by this process and particularly their derivatives such as the $C_8$–$C_{12}$ aliphatic alcohols find increasing use in such important fields as plasticizers and detergents. Poly functional compounds such as glycols may also be produced in this process. The preparation of 2-ethyl hexenaldehyde from n-butyraldehyde followed by hydrogenation to produce 2-ethyl hexanol for making plasticizers by esterification with dibasic organic acids such as phthalic acid is of particular interest.

The aldol reaction may be promoted by either basic or acidic catalysts. For best results, dilute or weak bases are employed to produce the aldol condensation in which the double bond of the barbonyl group reacts by undergoing addition with a molecule having at least one active hydrogen atom. A reactive alpha hydrogen atom adjacent to the carbonyl group adds to the O and the rest of the molecule adds to the C in similar fashion to the formation of aldol from two molecules of acetaldehyde:

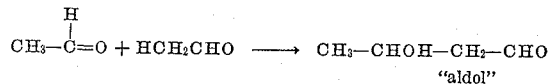

In addition, acetaldehyde may be used to supply the carbonyl group for an aldol condensation with another substance which supplies the alpha hydrogen. Thus, the carbonyl group of acetaldehyde readily undergoes reaction with active hydrogen atoms supplied by acetone.

Each of the initial materials would also condense with itself. The beta-hydroxy carbonyl compounds obtained in this way are readily dehydrated to give alpha, beta-unsaturated carbonyl compounds. Thus the two compounds obtainable from acetaldehyde and acetone are crotonaldehyde, and penten-3-one-2.

Acetaldehyde may also supply the alpha hydrogen for condensation with the carbonyl group of another compound. Thus acetaldehyde undergoes easy reaction with formaldehyde. After the initial reaction, the remaining hydrogens of the acetaldehyde can react with more formaldehyde finally giving tri(hydroxymethyl) acetaldehyde. If an excess of formaldehyde is used, the aldehyde group is reduced to form pentaerythritol.

When a mixture of two different aldehydes is subjected to the aldol condensation, four products are possible but the chief reaction generally consists in the union of the carbonyl of the smaller one with an alpha H from the larger one. In general, the ease of supplying the alpha H for the condensation is in the order

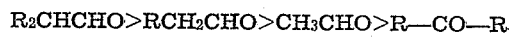

In general, ketones react quite sluggishly in aldol type condensations, and other more strenuous conditions must be employed to give appreciable yields.

The aldol condensation is given by certain alpha H compounds other than aldehydes and ketones. In general, any C—H compound which will give a sodium derivative, such as malonic ester, acetoacetic ester, cyanoacetic ester, and nitromethane will condense with aldehydes in the presence of a trace of base or acid. As many molecules of aldehyde can react as there are alpha H atoms if the reaction is not carefully controlled.

The "aldol" formed lose water readily if they contain remaining alpha H atoms. This gives an important preparative method for making alpha, beta-unsaturated carbonyl compounds and the corresponding saturated alcohols.

The aldol condensation can also be obtained with a hydrogen atom which is "alpha" to a conjugatedly unsaturated aldehyde system. This gives an important method for making aldehydes with several ethylenic linkages in conjugated relation.

A wide variety of aldol condensations have been studied and results of these recorded in the literature. In the case of acetone such compounds as diacetone alcohol, mesityl oxide, isophorone, xylitones, etc. may be formed. Methyl ethyl ketone may be similarly condensed to give a variety of condensation products of similar structure. It is also known to cross-condense ketones of this type, e. g. condense acetone with methyl ethyl ketone, to obtain mixed condensation products. One or more aldehydes may be similarly condensed to yield aldolic compounds or the dehydration products of these such as alpha, beta-unsaturated aldehydes and alcohols. Acetaldehyde may be condensed to yield crotonaldehyde, hexenyl aldehyde, octenyl aldehyde, etc. It is also known to cross-condense aldehydes and ketones to obtain mixed condensation products of these, for instance, acetone may be condensed with acetaldehyde to yield an unsaturated ketone containing five carbon atoms. Typical compounds which may be prepared by this method include the following: (1) acrolein from formaldehyde and acetaldehyde; (2) aldol and crotonaldehyde from acetaldehyde; (3) n-propenyl methyl ketone from acetaldehyde and acetone; (4) mesityl oxide and isophorone from acetone; (5) methyl vinyl ketone from acetone and formaldehyde; (6) isoamylene ethyl ketone from methyl ethyl ketone; (7) n-butyraldol (2-ethyl hexanol-3-al-1) or 2-ethyl hexenal from butyraldehyde; (8) i-butyraldol from isobutyraldehyde; (9) 2,2-dimethyl hexanol-3-al-1 and 2-ethyl-4-methyl pentanol-3-al-1 from butyraldehyde and isobutyraldehyde; and (10) 2,4-di-isopropyl-5,5-dimethyl-6-hydroxy-1,3-dioxane from three molecules of isobutyraldehyde.

Known conventional aldolization techniques using merely a caustic catalyst, depend on carrying the reaction out batchwise with some form of agitation to mix the aqueous alkali catalyst and the immiscible organic aldehyde phase. While these reactions go for the most part in a general way quite readily under the influence of basic catalysts, a number of difficulties are encountered in practice in obtaining good yields of any single desired product. One difficulty is due to the fact that even the primary reaction products of such condensation reactions are themselves quite reactive and hence tend to undergo further condensation reactions with themselves and with the primary reactants to yield higher molecular weight compounds. Hence, in most instances, in aldol processes utilized to date, one is not able to control the reactions very selectively. Quite generally the successive condensation reactions occur simultaneously, yielding products of a wide range of molecular weights and of a wide range of degrees of condensation. In certain cases, by limiting the extent of conversion of the starting materials, it is possible to obtain predominantly the primary (or primary and secondary) products. Working at low conversion levels has certain disadvantages, however, in that it requires considerable recovery and recycling of the starting materials. In acetone condensation, for instance, when using liquid phase conditions with strong basic catalyst, conversions must be limited to 10% or less in order to obtain reasonably selective formation of mesityl oxide. At conversions well above this level, isophorone becomes a major product and at conversions around 50% greatly predominates over mesityl oxide. At even 50% conversions, compounds of higher molecular weight than isophorone are also formed. It is obvious that previous batch operations have not resulted in any process suitable for directing aldol condensation reactions to the selective formation of a single end product at high levels of conversion of starting materials. The exothermic nature of aldol condensations when carried out batchwise as in prior art, causes rapid increases resulting in undesirable side reactions to give higher polymers. By means of this improved process, it is easy to control temperature as well as other reaction conditions, particularly for carrying out aldolizations of aldehydes. However, in general, for carrying out aldolizing type reactions of ketones, it is necessary to employ other more drastic conditions than those contemplated for this invention.

A novel process described herein is an aldolization in which the aldolizing reaction may be controlled such that it may proceed in a stepwise manner by which the desired condensation products are readily obtained.

Employing this novel process, it is preferred to operate in a continuous manner with the materials to be condensed being fed at an intermediate point in the column and water or media rich in water being fed at an upper point in the column. The column is provided with conventional refluxing and reboiling facilities to provide continuous operation under reboiling and refluxing conditions. In the case of reactions between two or more different aldehydes or ketones to produce mixed condensation products the individual reactant compounds may be fed at different intermediate points below the point of addition of the aqueous reflux media. Preferably the refluxing medium should contain a soluble catalyst suitable for promoting the aldol condensation reaction. The aldolization catalyst is generally a basic one, the preferred ones including alkali and alkaline earth hydroxides and salts of these derived from weak acids. Specific examples include NaOH, KOH, NaHCO$_3$ and the like. These may be dissolved in the aqueous medium up to concentrations ranging from 0.01 wt. percent to 10 wt. percent.

In addition to the basic catalyst the medium may contain certain hydrotropic solubilizing compounds, especially salts of organic carboxylic and sulfonic acids which tend to increase the solubility of the organic carbonyl compounds in the aqueous medium. The reaction may be carried out under a wide range of pressures and temperatures. When dealing with the lower boiling aldehydes, temperatures of 20–150° C. and atmospheric pressures are, in general, adequate. Condensation of ketones requires somewhat higher temperatures, for instance, up to 200° C. In fact temperatures and pressures approaching the critical conditions for the liquid contents of the column may be employed for carbonyl compounds which undergo aldolization with difficulty.

For most successful operation of this continuous aldolization process, it is considered highly advantageous to adjust the concentration of the hydrotropic solubilizer such that the aldehyde or ketone reactant is quite soluble but that the organic product formed by the aldolization reaction is relatively insoluble.

The hydrotropic salts referred to as useful for solubilizers can be described as highly polar compounds which, when added to a polar liquid, increase the solubility of solutes in that liquid. For the purposes of this invention, hydrotropic organic solubilizers and preferably salts of organic compounds are most useful. It is desirable that they have a solubility of at least 30 wt. percent in water although concentrations of 3–70 wt. percent may be employed. For aqueous solutions, these compounds have a basic carbon skeleton of not more than 12 or 15 carbon atoms since compounds containing more carbon atoms have a relatively low solubility in water. The carbon skeleton may be of the aliphatic, acyclic, or aromatic class and may be either carbocyclic, or heterocyclic in nature. The nuclei must have as substituents one or more polar radicals or solubilizing groups such as a sulfonic acid, a carboxylic acid, a sulfate, or a phosphonate. These may be used in the form of the free acid or base or preferably, as the more soluble salts such as sodium, potassium, or lithium salts. Specific examples of compounds which are useful include the water soluble salts of benzene sulfonic acids, toluene sulfonic acids, xylene sulfonic acids, cymene sulfonic acids, naphthalene sulfonic acids, cyclohexane sulfonic acids, sodium lauryl sulfate, methane and ethane sulfonic acids, ethionic acid, furoic acid, citric acid, and anthraquinone sulfonic acids. Mainly, the water soluble salts will include the alkali metal or amine salts of the acids. The soluble salts of aromatic sulfonic acids have been found to be particularly effective.

Care should be exercised in selecting the solubilizer compound to insure that it is chemically compatible with the catalyst used and with the carbonyl compound or compounds being aldolized.

A series of batchwise test runs carried out on the aldolization of n-butyraldehyde showed that the caustic normality required to initiate aldolization (initiation being measured by temperature rise) is very low in the solubilized system and increases linearly with increasing n-butyraldehyde concentration. The mols of caustic per mol of butyraldehyde required to initiate the reaction is constant at about 0.02 for the solubilized system in which a hydrotropic salt is present, while for the unsolubilized system, it varies from 0.08 to 0.25. The solubilized system thus shows a higher butyraldehyde capacity and requires a lower caustic-aldehyde ratio.

A series of runs also established the solubility-temperature relationship for n-butyraldehyde in 40 wt. percent mixed sodium xylene sulfonates. Solubility decreased from 44.5 vol. percent at 16° C. to 27.5 vol. percent at 65° C. in non-linear fashion.

In continuous runs, it has been found best to employ residence times of the reactants, that is, actual presence of the reactants in the reactor and distillation column, of from 1 to 20 minutes. In the specific examples given below, residence times of 5 to 10 minutes were employed. Residence in the still pot itself may vary from 10 minutes to 2 hours. In the specific runs, shown in Table I, still pot residences of approximately 50 minutes were employed.

This aldolization process can be carried out in a variety of ways. One preferred embodiment of the invention is shown in Figure 1 in which the aqueous solvent containing the organic solubilizer, together with the caustic employed as the aldolization catalyst, is passed into the upper part of a reactor and distillation column 4 by way of inlet pipe 11, the aldehyde to be aldolized initially enters the system by way of feed line 1, passes through a preheater 2, and thence is introduced into the reactor and distillation column at an intermediate point by way of line 3. The aldolization takes place within column 4. Column 4 is maintained at a temperature sufficient to give ready aldolization of the aldehyde and the temperature is sufficiently controlled such that unreacted aldehyde passes overhead from column 4 by way of line 5 as a vapor stream which is condensed in condenser 6. A part of the unreacted aldehyde may be removed from the system if desired by way of line 10, and a part or all of the aldehyde may be recycled via lines 9 and 1 back through the preheater and thence to the feed inlet 3 of aldehyde to the column 4. From the lower portion of reactor and distillation column 4, there is removed a mixture of aldolized products together with the aqueous organic solubilizer solution containing the basic catalyst used to carry out the aldolization. This mixture is removed by line 14 and a part is recycled by means of lines 15 and 17 through reboiler 16 to maintain column 4 at the desired temperatures. The remaining portion of this bottoms mixture is taken by line 18 to a phase separator 19 wherein two phases, an aqueous phase and an organic phase are formed. The organic phase is taken from the phase separator by line 20 as a mixed condensation product and may be subjected to purification and further reaction such as hydrogenation. A part of the aqueous phase may be removed from the system if desired and the remainder is recycled by lines 24, 13 and 12 back to the upper portion of reactor and distillation column 4. The aldolization process is illustrated by, but not limited to, the following specific examples.

*Example I*

This example can best be understood by reading it in conjunction with Figure 1. n-Butyraldehyde was continuously passed into the aldolizing system by inlet line 1 through preheater 2 wherein the aldehyde was preheated to the proper temperature for the appropriate plate of column 4 to which it was introduced (approx. 76° C.). Thence the heated aldehyde was passed by line 3 continuously to the 30th plate of a 1″ I. D. x 60 perforated plate vacuum-jacketed glass Oldershaw column indicated on Figure 1 as the reactor and distillation column 4. The feed rate of preheated butyraldehyde to column 4 was 139 cc./hr. A solvent-catalyst solution containing 33.3 wt. percent mixed sodium xylene sulfonates in water and 0.083 equivalents of sodium hydroxide per liter of solvent solution was charged into the reactor and distillation column 4 via inlet lines 11 and 12 at a feed rate of 368 cc./hr. A reflux ratio of 15 to 1 was maintained within column 4. The temperature at the midpoint was 76° C. Overhead by line 5 there was removed from the column a vapor stream consisting mainly of unreacted butyraldehyde. This vapor stream was passed to condenser 6 and condensed therein. A part of the condensed liquid was refluxed through line 7 back to column 4 and the remaining butyraldehyde was withdrawn via line 10. The overhead so removed each hour contained 14 ccs. unconverted butyraldehyde. From the bottom of tower 4 by line 14 there was removed, at the rate of 430 cc./hr., a bottoms product which contained 71 cc./hr. of organic liquid material. A part of this bottoms product was passed by lines 15 and 17 through reboiler 16 and back to column 4 while a portion of the product from line 14 was passed by line 18 into phase separator 19 wherein there was formed an organic phase and a water phase by gravity settling. The lower water phase in the phase separator 19 was removed by line 24. This phase consisted primarily of an aqueous hydrotropic salt-sodium hydroxide solution. A part of this aqueous solution was removed from the system by line 24 and was recycled via lines 13 and 11 back to the reactor and distillation column 4. The organic phase in phase separator 19 was removed by line 20 as mixed $C_8$ condensation products of n-butyraldehyde which can be further purified and/or hydrogenated. Vacuum distillation and analysis of the products showed 78 wt. percent conversion of n-butyraldehyde to $C_8$ condensation products with a selectivity to 2-ethyl hexenal of 89% and a yield of 2-ethyl hexenal of 69.3%. In the process carried out as described above, the aldehyde/solvent ratio on the plates was:

$$\frac{(\text{Reflux ratio}=15)(\text{cc./hr. overhead}=14)}{(\text{cc./hr. solvent}=368+(15)(14))}=36\%$$

which is at or slightly above the solubility limit for the aldehyde.

By thus working in a homogeneous system, the aldolization could proceed smoothly and rapidly in the presence of very dilute caustic. The high dilution of the aldehyde in the homogeneous system prevented violent reaction from occurring and allowed ready control of temperature. The $C_8$ reaction products were relatively insoluble in the system (about 5 vol. percent) so that they mainly separated out and did not undergo further aldolization. Also because of the continuous rather than batch operation, these $C_8$ products were quickly removed from the system, again reducing the tendency for repeated aldolization as encountered in batch work.

*Example II*

Since it is possible to obtain a mixture of normal and isobutyraldehyde by the oxonation of propylene, this mixture was considered important as a feed for aldolization. Thus, in another run in the same extractive distillation unit, a 50–50 vol. percent mixture of iso- and normal-butyraldehydes was fed to the 30th plate at 164 cc./hr. while the same mixed sodium xylene sulfonate-sodium hydroxide solvent solution was fed to the 60th plate at 411 cc./hr. The reflux ratio was 15/1 and the column temperature was 67° C. The overhead rate was 16 cc./hr. of organic material, chiefly aldehydes, while the bottoms product organic material rate was 69 cc./hr. The conversion of mixed iso- and n-butyraldehydes based on unreacted butyraldehyde recovered was 90%. A mixture of $C_8$ unsaturated aldehydes and aldols was obtained since some of the aldols do not dehydrate while others do undergo dehydration.

Vacuum distillation of the product indicated it to be a mixture of the possible aldols and their dehydration products. There are a number of possible reaction products from the condensation of normal and iso-butyraldehyde. Only two of the possible aldols (n-butyraldol and one iso-normal-butyraldol) dehydrate readily. About 15% of the mixed aldolization product is made up of dehydrated butyraldol (2-ethyl-hexenol).

The lower boiling 60% of the product (considered to be predominately aldols) was refluxed with acid at one atmosphere pressure to catalyze dehydration, then water washed to remove acid, and finally redistilled. The product is still predominantly aldols.

The effect of hydrogenation on the aldols and unsaturated aldehydes was also studied. After catalytic hydrogenation of the lower boiling 75% of organic product, about 20 vol. percent boils in the 2-ethylhexanol range while another 20 vol. percent boils at or above the boiling range of hydrogenated isobutyraldol. About 22 vol. percent appears to be iso-butanol, although distillation of the hydrogenation feed stock showed virtually no material in the $C_4$ aldehyde range. Continuous column aldolization of mixed normal and iso-butyraldehydes in the presence of NaOH catalyst and sodium xylene sulfonate solubilizer is thus seen to give, on hydrogenation of distilled products with bottoms rejected, a mixture of alcohols and glycols.

Operating data for the continuous aldolization examples as described in Examples I and II are summarized in Table I below.

*Table I.—Aldolization of butyraldehyde under continuous extractive distillation conditions employing aqueous mixed sodium xylene sulfonate solution as solvent*

| Run Number | Example I | Example II |
| --- | --- | --- |
| Feed | n-butyraldehyde | 1/1 vol. ratio iso/normal butyraldehyde. |
| Feed rate cc./hr | 139 | 164. |
| Solvent | (a) | (a) |
| Solvent rate cc./hr | 368 | 411. |
| Caustic Normality in Solvent | 0.083 | 0.083. |
| Aldehyde Conversion | 78 | 90. |
| Reflux Ratio | 15/1 | 15/1. |
| Average Column Temp., °C | 76 | 66.5. |
| Total Overhead rate cc./hr | 16.2 | 17.0. |
| Overhead Aldehyde cc./hr | 14.2 | 16.0. |
| Total Bottoms rate cc./hr.[b] | 430 | 512. |
| Bottoms Organic Phase cc./hr. | 71.1 | 68.5. |
| Duration of Run, hrs | 4 | 9.5. |
| Organic Material Recovery, percent. | 91 | 99.8. |

[a] 33.3 wt. percent mixed sodium xylene sulfonates in $H_2O$.
[b] Aqueous phase contains 5 vol. percent dissolved organic material.

Although the specific embodiments herein disclosed refer in detail to continuous aldolizations of butyraldehydes, other aldehyde or mixtures of aldehydes, especially in the $C_2$–$C_{12}$ range may be aldolized by this method. Furthermore, the process may be carried out batchwise using solubilized systems. Instead of mixed sodium xylene sulfonates, other hydrotropic salts, particularly sodium p-cymene sulfonate, may be used in the same, lower, or higher concentrations. Other condensing agents such as potassium hydroxide and sodium bicarbonate are effective in place of sodium hydroxide. With these variations, operating conditions may be altered so that the feed concentration on the plates is below solubility limits but so that the condensation products are relatively insoluble. These changes can be effected by adjusting the rate of solvent feed relative to organic feed, or by adjusting the reflux ratio. The solubility limit itself may be altered by the concentration of hydrotropic salts and by the temperature of operation. Rather than heat the liquid in the reactor and distillation column by means of a reboiler as shown in Figure 1, it is also possible, and in some cases, preferable, to heat the column liquid by indirect heating means using an indirect heat exchanger.

What is claimed is:

1. A process for aldolizing a saturated aliphatic carbonyl reactant compound having 4 carbon atoms to form a higher molecular weight aldol condensation product in the presence of an alkaline aldolization catalyst, which comprises solubilizing the carbonyl reactant in an aqueous solution of the catalyst containing admixed organic hydrotropic solubilizer, maintaining an adequate concentration of said solubilizer in the aqueous solution to dissolve said carbonyl reactant but inadequate to dissolve its aldol condensation product, heating the resulting solution of the carbonyl reactant to a temperature at which the reactant undergoes condensation to the aldol condensation product in the range of 20° C. to 200° C., distilling an unreacted portion of the carbonyl reactant from said solution and obtaining as a distillation residue product the aqueous solution containing the alkaline catalyst with the organic hydrotropic solubilizer dissolved therein mixed with the thus formed aldol condensation product present as a separate organic phase insoluble in said aqueous solution.

2. A process as defined in claim 1 wherein the carbonyl reactant is a C$_4$ aldehyde and the aldol condensation product includes a mixture of C$_8$ unsaturated aldehydes and aldols.

3. A continuous aldolization process which comprises continuously passing saturated aliphatic carbonyl reactants having 4 carbon atoms into an intermediate part of a fractional distillation zone, continuously flowing down through said zone an aqueous solution containing a basic aldolization catalyst and an organic hydrotropic solubilizer selected from the group consisting of organic carboxylic, sulfonic and phosphonic acids and salts of said acids, said organic hydrotropic solubilizer being present in an amount sufficient to solubilize said reactants in the aqueous solution, but not sufficient to solubilize their resultant aldol condensation product in the aqueous solution, condensing to their aldol condensation product at least a portion of said reactants dissolved in said aqueous solution within the fractional distillation zone, continuously separating unreacted portion of said carbon reactants by distillation from said zone, and continuously removing as a liquid residue from said zone an aqueous solution of the basic aldolization catalyst with the organic hydrotropic solubilizer mixed with the resulting aldol condensation product which is undissolved in said aqueous solution.

4. An improved aldolization process which comprises introducing continuously equimolar ratios of normal and isobutyraldehydes into the intermediate portion of a reaction-distillation zone, introducing in the upper portion of said zone an aqueous solvent solution containing approximately 33 weight percent of sodium xylene sulphonates and about 0.08 equivalents per liter of sodium hydroxide, maintaining a reflux ratio within said distillation zone of about 15:1, maintaining an average distillation zone temperature of about 76° C., continuously removing a vapor stream of unreacted butyraldehydes from the upper portions of said zone, condensing said vapor stream, returning at least a portion of said condensed aldehydes to the reaction-distillation zone, removing from the lower portion of said zone a mixture of C$_8$ aldol condensation products and alkaline aqueous solvent solution immiscible therewith, settling said mixture, recovering by decantation a mixture of oxygenated hydrocarbons having 8 carbon atoms and recycling a major portion of the aqueous solvent solution to the upper portion of said distillation zone.

5. A process for aldolization of n-butyraldehyde which comprises introducing continuously n-butyraldehyde into the intermediate portion of a reactor and distillation zone, introducing at the upper portion of said zone an aqueous solvent solution containing approximately 33 wt. percent of mixed sodium xylene sulfonates and 0.08 equivalents/liter sodium hydroxide, maintaining a reflux ratio within said column of 15:1, maintaining an average column temperature of 76° C., continuously removing a vapor stream of unreacted n-butyraldehyde from the upper portion of said column, condensing said vapor stream of n-butyraldehyde, returning at least a portion of said condensed n-butyraldehyde to the reactor and distillation column as feed, removing from the lower portion of said column a mixture of C$_8$ aldol condensation products and alkaline aqueous solvent solution immiscible therewith, settling said mixture, recovering by decantation a mixture of C$_8$ condensation products consisting primarily of 2-ethyl hexanol, and recycling a major portion of the aqueous solvent solution to the upper portion of said reactor and distillation column.

References Cited in the file of this patent

UNITED STATES PATENTS

| Number | Name | Date |
|---|---|---|
| 1,970,374 | Halbig et al. | Aug. 14, 1934 |
| 2,442,280 | Alheritiere | May 25, 1948 |
| 2,481,570 | Champagnat | Sept. 13, 1949 |
| 2,489,608 | Alheritiere | Nov. 29, 1949 |
| 2,516,837 | Happel et al. | Aug. 1, 1950 |